US012688141B2

(12) United States Patent
Norberg et al.

(10) Patent No.: US 12,688,141 B2
(45) Date of Patent: Jul. 21, 2026

(54) I/O MODULE ARRANGEMENT

(71) Applicant: ABB Schweiz AG, Baden (CH)

(72) Inventors: Robert Norberg, Eskilstuna (SE); Ulf Hansson, Västerås (SE); Göran Pettersson, Skultuna (SE); Joakim Bergqvist, Österfärnebo (SE); Rune Berglinn, Västerås (SE)

(73) Assignee: ABB SCHWEIZ AG, Baden (CH)

( * ) Notice: Subject to any disclaimer, the term of this patent is extended or adjusted under 35 U.S.C. 154(b) by 0 days.

(21) Appl. No.: 18/887,237

(22) Filed: Sep. 17, 2024

(65) Prior Publication Data

US 2025/0103535 A1     Mar. 27, 2025

(30) Foreign Application Priority Data

Sep. 25, 2023     (EP) ..................................... 23199295

(51) Int. Cl.
 *G06F 13/00*          (2006.01)
 *G06F 9/54*           (2006.01)
 *G06F 13/40*          (2006.01)

(52) U.S. Cl.
 CPC .................................. *G06F 13/409* (2013.01)

(58) Field of Classification Search
 None
 See application file for complete search history.

(56) References Cited

U.S. PATENT DOCUMENTS

| | | | | |
|---|---|---|---|---|
| 6,356,966 B1 * | 3/2002 | Loach | ................... | G06F 13/409 |
| | | | | 439/82 |
| 6,425,027 B1 * | 7/2002 | Mills | ..................... | G06F 13/409 |
| | | | | 710/300 |
| 6,466,200 B1 * | 10/2002 | Anton | ..................... | G01P 15/11 |
| | | | | 345/184 |
| 7,803,020 B2 * | 9/2010 | Crane, Jr. | ............ | H05K 7/1445 |
| | | | | 439/43 |
| 10,804,631 B2 * | 10/2020 | Wig | ........................ | G06F 1/266 |
| 2003/0123219 A1 * | 7/2003 | Chiu | ..................... | G06F 13/409 |
| | | | | 361/679.4 |
| 2012/0156913 A1 * | 6/2012 | Haswarey | ........ | H01R 13/62933 |
| | | | | 29/446 |
| 2015/0120972 A1 | 4/2015 | Tanimura et al. | | |
| 2015/0347342 A1 | 12/2015 | Alley et al. | | |
| 2016/0299863 A1 * | 10/2016 | Feldman | .............. | G06F 13/362 |
| 2018/0341609 A1 * | 11/2018 | Tanimura | .............. | G06F 13/409 |

(Continued)

FOREIGN PATENT DOCUMENTS

EP     3798769 A1     3/2021

OTHER PUBLICATIONS

European Search Report; Application No. 23199295.9; Completed: Feb. 23, 2024; Mailing Date: Mar. 7, 2024; 9 Pages.

*Primary Examiner* — Hyun Nam

(74) *Attorney, Agent, or Firm* — Greenberg Traurig, LLP

(57)          ABSTRACT

An I/O module arrangement for a process control system having a first base plate for at least one I/O module, the first base plate including a first socket for a first I/O module and a first set of connection terminals for connection of the first I/O module to a first set of wires leading to a first group of field devices of the process control system, the first base plate being adapted to allow the first and any other I/O module that is attached to it to be any type of I/O module operating on input and output of any type of field device.

16 Claims, 5 Drawing Sheets

10

(56) References Cited

U.S. PATENT DOCUMENTS

| 2019/0347231 | A1 | 11/2019 | Johnson et al. |
| 2020/0334173 | A1 | 10/2020 | Hughes et al. |
| 2021/0209049 | A1 | 7/2021 | Gillespie et al. |
| 2023/0014118 | A1 | 1/2023 | Schaper et al. |

* cited by examiner

I/O MODULE ARRANGEMENT

TECHNICAL FIELD

The present invention relates to an Input/Output (I/O) module arrangement for a process control system.

BACKGROUND

An industrial process in a process control system may be controlled by a controller. In the providing of such control the controller may communicate with field devices via I/O modules.

An I/O module may then be provided on a base plate.

US 2015/120972 discloses an I/O module arrangement that includes a base plate, an option-module, a universal I/O module and a plurality of terminals, where the option-module enables various field devices to be connected to the same universal I/O module. The option-module performs conversion of communication protocols and signal processing such as amplification and attenuation. Furthermore, a set of two universal I/O modules may be attached to the same base plate, allowing redundant operations.

In a process control system there may be numerous I/O modules and numerous base plates to interface to different signal types, different voltages, different powering principles of the field device (source or sink), single/redundant IO etc.

Having many different base plates complicates planning, ordering, installation and commissioning.

One example of this can be understood from FIG. 1, which schematically shows an I/O module arrangement 10. The arrangement 10 comprises a first base plate BP1A 12 that includes a first socket SO1 16 (shown as a dashed rectangle), to which a first I/O module IOM1A 14 is connected. It also comprises a first set of connection terminals CT1A 18 for connection of the first I/O module 14 to field devices. There is also a second base plate BP2A 2o having a second socket SO2 24 (also shown as a dashed rectangle) to which a second I/O module IOM2A 22 is connected. The second base plate 20 comprises a second set of connection terminals CT2A 26 for connection of the second I/O module 22 to field devices. There is furthermore a third base plate BP3A 28 that includes a third socket (not shown), to which a third I/O module IOM3A 30 is connected as well as a third set of connection terminals for connection of the third I/O module 30 to field devices. There is also a fourth base plate BP4A 32 having a fourth socket (not shown) to which a fourth I/O module IOM4A 34 is connected.

The field devices of the process control system may be connected to multicore cables. When connecting these field devices to the I/O modules, wires of the multicore cables are connected to terminal blocks, typically provided in a marshaling cabinet. Thereafter, the terminal blocks are connected to the base plates. In the example shown in FIG. 1 the wires of a first multicore cable MCC1 40 are connected to a first group of terminal blocks TB1 36 and the wires of a second multicore cable MCC2 42 are connected to a second group of terminal blocks TB2 38. There is here one terminal block per wire in the corresponding multicore cable. The first group of terminal blocks 36 connects some of the wires of the first multicore cable 40 to the first set of connection terminals 18 of the first base plate 12 and other wires of the first multicore cable 40 to the second set of connection terminals 26 of the second base plate 20, while the second group of terminal blocks 38 connects some of the wires of the second multicore cable 42 to the third set of connection terminals of the third base plate 28 and other wires of the second multicore cable 42 to the fourth set of connection terminals of the fourth base plate 32.

The connection of the wires of the multicore cables to the terminal blocks is typically done by persons without knowledge of the signals that are carried by these. The wires of a multicore cable may in this case typically be connected to a terminal block in an order in which they appear in the multicore cable. When interconnecting the terminal blocks with the base plates some more considerations have typically to be made. Which wires that are connected where here depends on the type of signals carried by the wires and the capabilities of the I/O modules. This often requires more qualified personnel. As can be seen in FIG. 1 cross-connection of wires is also normally required.

Needless to say, the connection of field devices to IO modules can be both labor intensive, time consuming and relatively complex.

In addition, through the use of several different base plates changes may be difficult, e.g. if a digital input signal changes from 24V to 230V the base plate may have to be changed. The same applies if a loop requires higher availability and one must change from single to redundant I/O modules and base plates.

There exist some prior art addressing different types of signals.

For instance, US 2020/0334173 discloses a U-I/O card that comprises Universal I/O ICs and is provided for digital and analog IO signals, different voltage levels as well as resistance temperature detectors and thermocouples. Moreover, a U-I/O card is also connected to a field terminal array UFTA of a marshalling cabinet, to which marshaling cabinet field devices are also connected.

EP 3798769 discloses an IO device with IO modules provided on an IO base and configurable for analog or digital signals and or RTD or thermocouples. There is also a discussion about two configurable IO modules being 100% redundant with respect to each other and being operably connected to share a single common terminal block that bridges first and second terminal block mounting locations.

Another document of interest is US 2021/209049, which discloses a signal processor connected to a socket of a base, where four I/O module electrical connectors are connected to the socket for connection of field devices.

However, there is still room for an improvement in relation to the provision of I/O modules in a process control system.

SUMMARY

The invention therefore aims at providing an improvement in the way that I/O modules are provided in a process control system.

This object is achieved through an Input/Output, I/O, module arrangement for a process control system, the I/O module arrangement comprising:

a first base plate for at least one I/O module, the first base plate comprising a first socket for a first I/O module and a first set of connection terminals for connection of the first I/O module to a first set of wires leading to a first group of field devices of the process control system, the first base plate being adapted to allow the first and any other I/O module that is attached to it to be any type of I/O module operating on input and output signals of any type of field device, such as AI RTD/TC, AO mA, AO mA, AI V, AO V and DI 24V to 230V, DO 24V to 230V, HART, 2-wire, 3-wire, 4-wire, sink and source field devices.

Thereby the I/O modules may be I/O modules in the group of: AI RTD/TC, AI mA, AO mA, AI V, AO V and DI 24V to 230V, DO 24V to 230V and HART and the field devices may be field devices in the group of 2-wire, 3-wire, 4-wire, sink and source field devices.

In order to be universal, the number of connection terminals in the first set may have to correspond to the maximum possible number of field device connections that can exist in the different types of I/O modules. Thereby the number of connection terminals may correspond to the maximum number of field device connections that can be made to an I/O module. The connection terminals in the first set may additionally comprise three or more connection terminals per connectable field device.

The I/O modules may additionally be able to operate on input and output signals having different voltage levels. The distance between the connection terminals of the first set of connection terminals may then be based on the creepage and clearance distances associated with the highest of the possible voltage levels of the input and output signals, i.e. with the highest possible signal voltage level of the input and output signals. When the highest voltage is 230 V, the connection terminals may be adapted to the 230 V voltage level. The creepage and clearance distances may be creepage and clearance distances specified by applicable industry standards, such as IEC 61010-1 and IEC 61010-2-201.

The first socket may also have connection terminals for mating with corresponding connection terminals of the first I/O module and the connection terminals of the first set of connection terminals may be interconnected with connection terminals of the first socket by conductors running in the first base plate. In this case the distance between the conductors may be based on the creepage and clearance distances associated with the highest of the possible voltage levels of the input and output signals and the connection terminals of the first socket may be based on the creepage and clearance distances associated with the highest of the possible voltage levels of the input and output signals.

The first socket may also comprise one or more connection terminals allowing the first I/O module to communicate with a controller of the process control system via a fieldbus. The first socket may thus comprise one or more connection terminals for connecting the first I/O module to the controller via the fieldbus. For this reason, the first base plate may also comprise at least a part of a local bus that interconnects these connection terminals of the first socket with the fieldbus socket.

The I/O module arrangement may also comprise a second socket for a second I/O module and a second set of connection terminals.

The second set of connection terminals may be provided for connection of the second I/O module to a second set of wires leading to a second group of field devices of the process control system.

The second socket may also have connection terminals for mating with corresponding connection terminals of the second I/O module and the connection terminals of the second set of connection terminals may be interconnected with connection terminals of the second socket by conductors. In this case the distance between the connection terminals of the second set of connection terminals, the distance between the conductors that interconnect the second set of connection terminals with the second socket and the connection terminals of the second socket may be based on the creepage and clearance distances associated with the highest of the possible voltage levels of the input signals and output signals.

The second socket may also comprise one or more connection terminals allowing the second I/O module to communicate with the controller of the process control system via the fieldbus. The second socket may thus comprise one or more connection terminals for connecting the second I/O module to the controller via the fieldbus. For this reason, a base plate that comprises the second socket may also comprise at least a part of a local bus that interconnects the connection terminals of the second socket with a fieldbus socket.

The fieldbus socket may be provided on one of the base plates, such as the first or the second base plate. The fieldbus socket may additionally comprise or hold a fieldbus communication unit instead of an I/O module. The fieldbus communication unit and/or the fieldbus socket, may also be considered to form a fieldbus communication interface.

The second socket and the second set of connection terminals may be provided on the first base plate.

The I/O module arrangement may also comprise a second base plate. In this case the second socket and the second set of connection terminals may be provided on the second base plate.

The I/O module arrangement may additionally comprise the I/O modules. It may thus comprise the first and the second I/O modules.

The first I/O module may be a first type of I/O module and the second I/O module may be a second type of I/O module.

The first I/O module may operate on input signals and output signals of the first set of wires that have a first voltage level and the second I/O module may operate on input signals and output signals of the second set of wires that have a second voltage level. The distance between the connection terminals of each set may be based on the creepage and clearance distances associated with the highest of the possible voltage levels of the input signals and output signals. These creepage and clearance distances may be creepage and clearance distances specified by applicable industry standards, such as IEC 61010-1 and IEC 61010-2-201.

The first I/O module may operate on more than one voltage level, such as 24V and 230 V. It is instead or additionally possible that the second I/O module can operate on more than one voltage level.

The first I/O module may additionally only operate on analog input signals and analog output signals and the second I/O module may only operate on digital input signals and digital output signals or vice versa. The first I/O module may thus only be capable to operate on analog input signals and analog output signals and the second I/O module may only be capable to operate on digital input signals and digital output signals. Thereby the first I/O module may be a universal analog I/O module and the second I/O module may be a universal digital I/O module or vice versa.

In this case the first set of connection terminals may be connected to the first group of field devices via one or more multicore cables only carrying analog input signals and analog output signals and the second set of connection terminals may be connected to the second group of field devices using one or more multicore cables only carrying digital input signals and digital output signals. The first set of wires may thus comprise one or more multicore cables only carrying analog input signals and analog output signals and the second set of wires may comprise one or more multicore cables only carrying digital input signals and digital output signals. The I/O module arrangement may also comprise the first and second sets of wires in the form of two or more multicore cables.

The first set of connection terminals may be adapted to be attached to the one or more multicore cables only carrying analog input signals and analog output signals and the second set of connection terminals may be adapted to be attached to the one or more multicore cables only carrying digital input signals and digital output signals.

An I/O module may perform signal conditioning of input and output signals and optionally also analog-to-digital (A/D) or digital-to-analog (D/A) conversion.

At least the first I/O module may be a universal I/O module, such as an I/O module handling both digital and analog input and output signals as well as all possible voltage levels. The first I/O module may thus be a universal I/O module. Also the second I/O module may be a universal I/O module.

The I/O module arrangement may also comprise a signal bridge for interconnecting one set of connection terminals associated with a socket for one I/O module with another set of connection terminals associated with another socket for another I/O module. The two I/O modules may additionally be of the same type, for instance for providing redundancy. The interconnected sets of connection terminals may for instance be the first and the second sets of connection terminals.

The first base plate may further comprise a first and a second field bus communication interface.

The first base plate may have a rectangular shape and the first set of connection terminals may be provided along a first side of the first base plate.

The second base plate may be attachable to a third side of the first base plate.

The I/O module arrangement may further comprise a third base plate, attachable to a fourth side of the first base plate.

When the second socket and the second set of connection terminals are provided on the second base plate, the second set of connection terminals may be provided along the first side of the second base plate.

When the second socket and the second set of connection terminals are provided on the first base plate, the second set of connection terminals may be provided along a second side of the first base plate that is opposite of the first side.

If the first base plate has a horizontal orientation when being mounted in a mounting cabinet, then one of the first and second sides may be directed upwards and the other downwards. If on the other hand the first base plate has a vertical orientation when being mounted in the mounting cabinet, then one of the first and second sides may be provided on a left side and the other on a right side of the base plate.

The I/O module arrangement may additionally comprise a third socket for a third I/O module, a third set of connection terminals as well as a fourth socket for a fourth I/O module and a fourth set of connection terminals. The third set of connection terminals may be used for connection of the third I/O module to a third set of wires leading to a third group of field devices of the process control system and the fourth set of connection terminals may be used for connection of the fourth I/O module to a fourth set of wires leading to a fourth group of field devices of the process control system. It is also possible to connect a signal bridge between the third and fourth sets of connection terminals and keep one of the sets unconnected to any wires.

The third and fourth sockets and the third and fourth sets of connection terminals may be provided on the first base plate, the second base plate or on one or more further base plates.

The third I/O module may be of the same type or the third I/O module may be of a third type and the fourth I/O module may be of a fourth type.

The I/O module arrangement may additionally comprise a fifth socket for a fifth I/O module, a fifth set of connection terminals as well as a sixth socket for a sixth I/O module and a sixth set of connection terminals.

The fifth set of connection terminals may be used for connection of the fifth I/O module to a fifth set of wires leading to a fifth group of field devices of the process control system and the sixth set of connection terminals may be used for connection of the sixth I/O module to a sixth set of wires leading to a sixth group of field devices of the process control system. It is also possible to connect a signal bridge between the fifth and sixth sets of connection terminals and keep one of the sets unconnected to any wires.

The fifth and sixth sockets and the fifth and sixth sets of connection terminals may be provided on the first base plate, a third base plate or one or more further base plates. The fifth and sixth I/O modules may be of the same or different types.

BRIEF DESCRIPTION OF THE DRAWINGS

The present invention will in the following be described with reference being made to the accompanying drawings, where FIG. 1 (previously presented) schematically shows a known I/O module arrangement comprising a number of base plates and I/O modules connected to two multicore cables via two terminal blocks, FIG. 2 schematically shows a view from above of a first embodiment of an I/O module arrangement comprising a first I/O module and a first base plate comprising a first terminal block comprising a first set of connection terminals and a first slot for the first IO module, FIG. 3 schematically shows a view from above of a second embodiment of an I/O module arrangement comprising two base plates and two I/O modules, FIG. 4 schematically shows a view from above of the I/O module arrangement according to the second embodiment, where a first multicore cable is connected to the first base plate and a second multicore cable is connected to the second base plate, FIG. 5 schematically shows a view from above of a third embodiment of an I/O module arrangement comprising four base plates and four I/O modules, FIG. 6 schematically shows a view from above of a fourth embodiment of an I/O module arrangement comprising a first base plate with a first and a second I/O module and a second base plate with a third and fourth I/O module, FIG. 7 schematically shows a view from above of a variation of the fourth embodiment of the I/O module arrangement, and FIG. 8 schematically shows a view from above of a fifth embodiment of an I/O module arrangement comprising a first base plate with a plurality of I/O modules.

DETAILED DESCRIPTION

In the following there will be given a detailed description of embodiments of an Input/Output (I/O) module arrangement comprising at least one base plate and possibly also at least one I/O module.

Figures 1, 2:
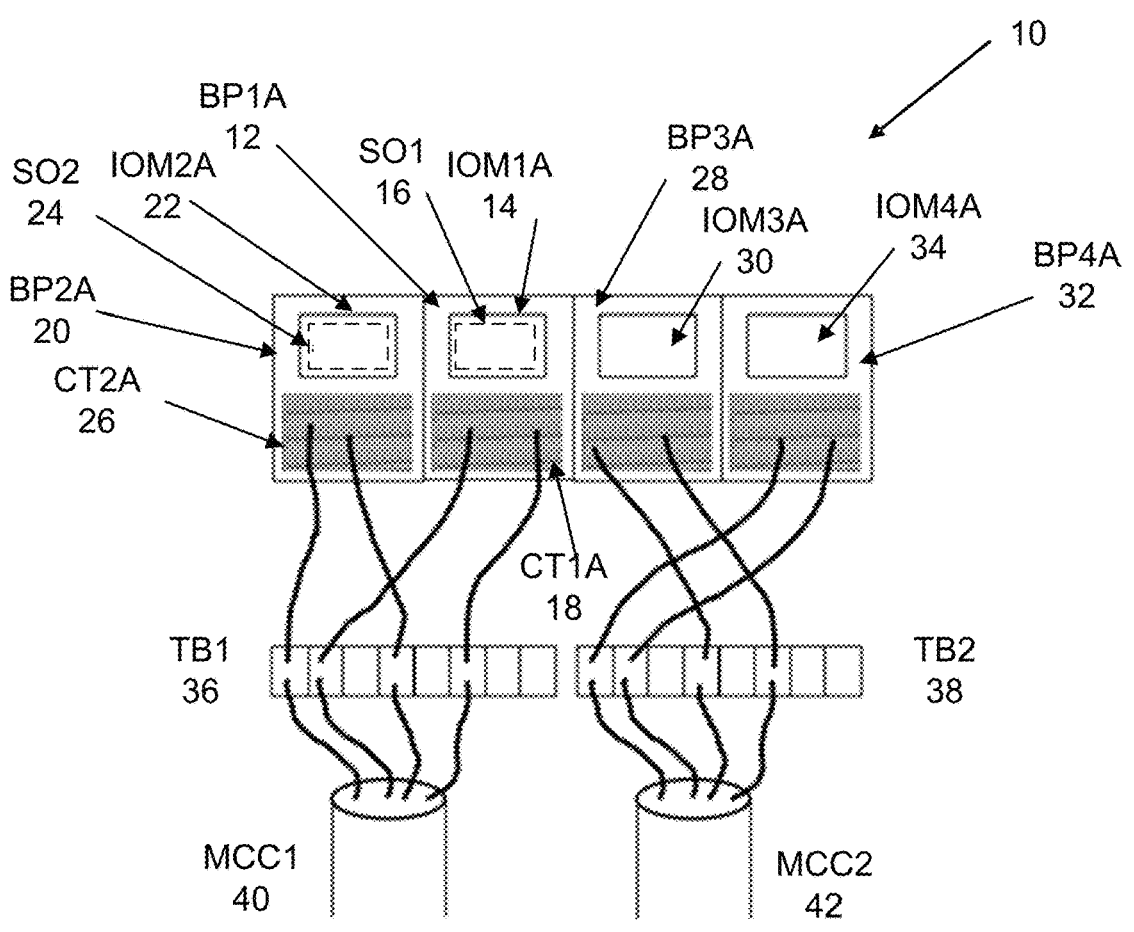

FIG. 2 shows a view from above of a first embodiment of an I/O module arrangement 10 for a process control system, which arrangement 10 comprises a first base plate BP1A 12 for at least one I/O module, where the first base plate 12 comprises a first socket SO1 16 for a first I/O module IOM1 14 and a first set of connection terminals CT1A 18 for connection of the first I/O module 14 to a first set of wires leading to a first group of field devices of the process control system. In the first embodiment, the I/O module arrangement 10 comprises the first I/O module 14. However, it should be realized that it may instead only comprise the first base plate 12.

The first base plate 12 is rectangular in shape and has a first side S1A and an opposite second side S2A. It also has a third side S3A that stretches between a first end of the first side S1A and a first end of the second side S2A as well as a fourth side S4A that stretches between a second end of the first side S1A and a second end of the second side S2A.

The first base plate 12 has a first set of connection terminals CT1A 18, which first set may be provided in a first terminal block. The first base plate 12 also comprises the first socket 16, where the first I/O module 14 is adapted to be received in the first socket 16. According to aspects of the present disclosure all possible I/O modules may be received in the first socket 16. The first set of connection terminals CT1A comprises connection terminals to which it is possible to connect wires of field devices of a process control system, such as a first set of wires leading to a first group of field devices. The connection terminals are interconnected within the base plate 12 with corresponding connection terminals of the socket 16, each provided for connection to a corresponding connection terminal of the first I/O module 14. Therefore, when being inserted in the first socket 16, connection terminals of the first I/O module 14 are electrically connected to corresponding connection terminals of the first set of connection terminals 18 and to which a first set of wires leading to first group of field devices may be connected.

The first base plate 12 is adapted to allow the first and any other I/O module that is attached to it to be any type of I/O module operating on input and output signals of any type of field device, which operating may typically involve signal conditioning and optionally also analog-to-digital (A/D) or digital-to-analog (D/A) conversion. For this reason, the first base plate 12 may be a universal base plate allowing connection to all kinds of I/O modules and input and output signals, such as for Analog Input (AI), Analog Output (AO), Digital Input (DI), Digital Output (DO), Highway Addressable Remote Transducer (HART), Resistance temperature detector (RTD), Thermocoupler (TC) and NAMUR signals, where NAMUR is an abbreviation for Normenarbeitsgemeinschaft für Mess- und Regeltechnik in der chemischen Industrie". The input and output signals may additionally have different voltage levels, such as 24V, 48V, 120V and 230V. Thereby the I/O modules may be AI RTD/TC, AI mA, AO mA, AI V, AO V and DI 24V to 230V, DO 24V to 230V or HART I/O modules. Thereby the I/O modules may also be I/O modules in the group of: AI RTD/TC, AI mA, AO mA, AI V, AO V and DI 24V to 230V, DO 24V to 230V and HART. Furthermore, the connected field devices may be HART, 2-wire, 3-wire, 4-wire, sink and source field devices. Thereby the field devices may be field devices in the group of HART, 2-wire, 3-wire, 4-wire, sink and source field devices.

The first I/O module may be a universal I/O module, such as an I/O module handling both digital and analog input and output signals as well as all possible voltage levels. The first I/O module may thus be a universal I/O module. Alternatively, it may be any type of dedicated I/O module.

The connection terminals in the first set 18 may allow 1-, 2-, 3- and 4-wire equipment to be connected to the first I/O module 14 as well as the connection of sink or source field devices. In order to be universal, the number of connection terminals in the first set may have to correspond to the maximum possible number of field device connections that can exist in the different types of I/O modules. The connection terminals in the first set may additionally comprise three or more connection terminals per connectable field device.

The I/O modules may additionally be able to operate on input and output signals having different voltage levels. The distance between the connection terminals of each set of connection terminals may then be based on the creepage and clearance distances associated with the highest of the possible voltage levels of the input and output signals. Thus, the distance between the connection terminals in the first terminal block may be dimensioned for handling the creepage and clearance distances associated with the highest possible signal voltage of the input and output signals, which may be 230 V. The connection terminals may thus be adapted to the 230 V voltage level. As an example the first I/O module may be an I/O module that operates on input and output signals at a voltage of 24V. The creepage and clearance distances may be creepage and clearance distances specified by applicable industry standards, such as IEC 61010-1 and IEC 61010-2-201.

Also the distances between connection terminals of the first socket 16 and the distances between the conductors in the first base plate 12 that interconnect these connection terminals with the connection terminals of the first set of connection terminals 18 may be based on the creepage and clearance distances associated with the highest of the possible voltage levels. However, the first IO module 14 may only need such distances if actually operating at the voltage level in question.

The first universal base plate is thus designed in such a way so it can interface to all different signal types. The base plate will also have terminals so that 1-wire, 2-wire, 3-wire and 4-wire instruments can be connected.

The first set of connection terminals 18 may be provided along the first side S1A of the first base plate 12.

The first socket 16 may also comprise one or more connection terminals allowing the first I/O module 14 to communicate with a controller in a process control system via a fieldbus. The first socket may thus comprise one or more connection terminals for connecting the first I/O module 14 to the controller via the fieldbus.

The first base plate 12 may comprise at least a part of a local bus that interconnects the connection terminals of the first socket with a fieldbus socket. In this case the whole of the local bus may be provided via the first base plate 12. Also the fieldbus socket may in this case be provided on the first base plate. The fieldbus socket may additionally comprise or hold a fieldbus communication unit instead of an I/O module.

Modular I/O arrangements are normally built up by a base plate and an I/O module. In most cases there may exist numerous I/O modules and numerous base plates to interface to different signal types, different voltages, different powering principles of the field device (source or sink), single/redundant I/O in order to allow a desired I/O module arrangement to be formed.

Having many different base plates complicates planning, ordering, installation and commissioning. In addition, it does not allow for easy changes, e.g. if a digital input signal changes from 24V to 230V, the base plate may have to be changed. The same applies if a loop requires higher availability and one must change from single to redundant I/O modules and base plates.

The above described I/O module arrangement simplifies planning and installation of I/O systems in cabinets with a universal base plate for all signal types. In addition, it allows for easy changes, e.g. if a digital input signal changes from 24V to 230V.

In the example above, the I/O module arrangement only included one base plate with the first socket for the first I/O module 14 and the first set of connection terminals 18. However, it is possible that it comprises a second socket for a second I/O module and a second set of connection terminals for connection of the second I/O module to a second set of wires leading to a second group of field devices of the process control system.

As can be seen later, the second socket and the second set of connection terminals may be provided on the first base plate. However, the I/O module arrangement may alternatively comprise a second base plate. In this case the second socket and the second set of connection terminals may be provided on the second base plate.

The I/O module arrangement may thus comprise more than one base plate.

Figure 3:
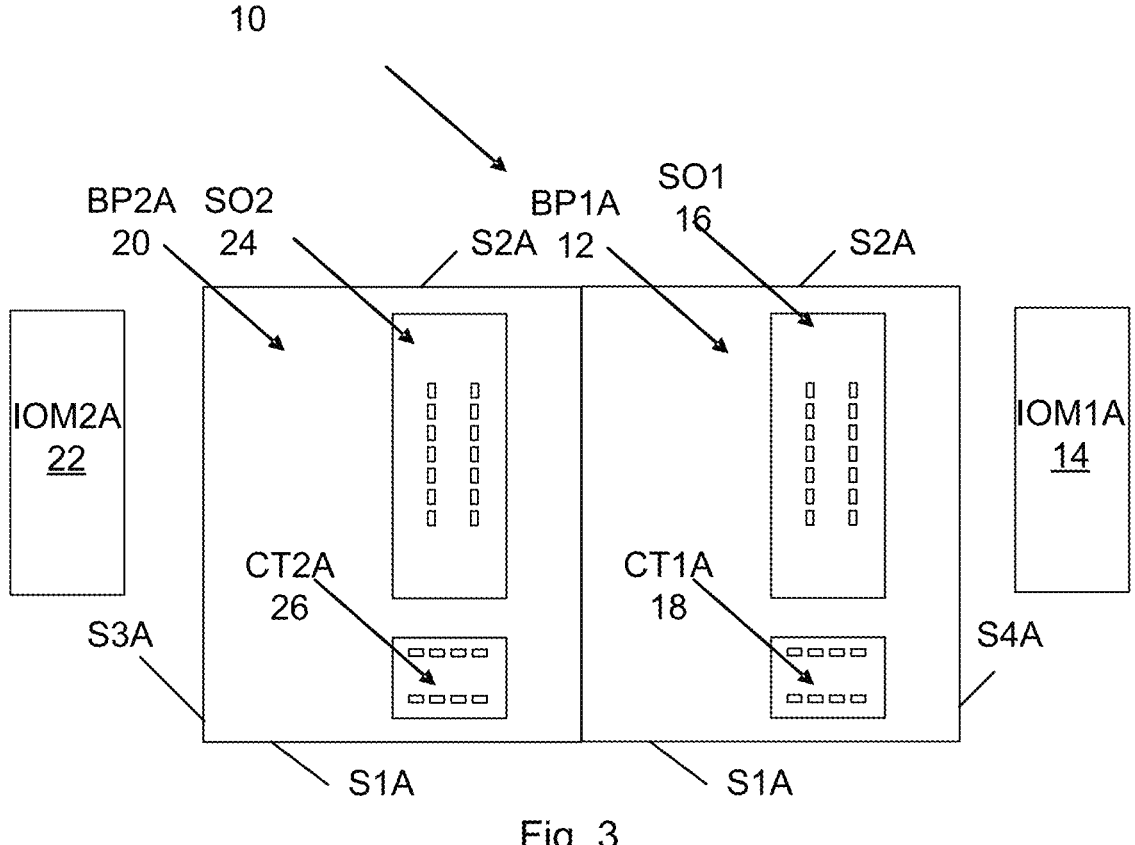

One example of this can be seen in FIG. 3, which shows a second embodiment of the I/O module arrangement 10. In this case the I/O module arrangement 10 comprises a first and a second I/O module and a first and a second base plate, which base plates are identical. The slots and connection terminal blocks thus have the same realization in the two base plates.

In this case there is thus a second base plate BP2A 20 in addition to the first base plate BP1A 12.

The second base plate 20 is likewise rectangular in shape with a first side S1A, with an opposite second side S2A, with a third side S3A stretching between a first end of the first side S1A and a first end of the second side S2A as well as with a fourth side stretching between a second end of the first side S1A and a second end of the second side S2A.

The second base plate 20 likewise has a second set of connection terminals CT2A 26, which second set may be provided in a corresponding second terminal block. The second base plate 20 also comprises a second socket SO2 24, into which the second I/O module 22 is adapted to be received. The second set of connection terminals 26 comprise connection terminals to which it is possible to connect wires of field devices of the process control system, such as to a second set of wires leading to a second group of field devices of the process control system. The connection terminals of the second set 26 are interconnected within the second base plate 20 with corresponding connection terminals of the second socket 24, each provided for connection to a corresponding connection terminal of any type of I/module inserted in the second socket 24, for instance the second I/O module 22. Therefore, when being inserted in the second socket 24, connection terminals of the second I/O module 22 are connected to corresponding connection terminals of the second set of connection terminals 26.

The second base plate may be attachable to the third side of the first base plate. Put differently, the third side of the first base plate 12 may be attached to the fourth side of the second base plate 20.

As can be seen above, both base plates 12, 20 have a set of connection terminals 18, 26 for the connection of field devices to the first and second I/O modules 14, 22 attached to the sockets 16, 24. As can be seen in FIG. 3 all these sets of connection terminals are provided at the first side S1A of the base plates 12, 20. Thereby the sets of connection terminals are aligned with each other along the first sides S1A of the base plates 12, 20.

The second socket 24 also has connection terminals for mating with corresponding connection terminals of the second I/O module 22 and the connection terminals of the second set of connection terminals 26 are interconnected with connection terminals of the second socket by conductors in the second base plate 20. As the second base plate 20 has the same realization as the first base plate 12, the distance between the connection terminals of the second set of connection terminals 26, the distance between the conductors that interconnect the second set of connection terminals 26 with the second socket 24 and the corresponding connection terminals of the second socket 24 may be based on the creepage and clearance distances associated with the highest of the possible voltage levels of the input and output signals.

The second socket 24 may also comprise one or more connection terminals allowing the second I/O module 22 to communicate with the controller of the process control system via the fieldbus. The second socket 24 may thus comprise one or more connection terminals for connecting the second I/O module 22 to the controller via the fieldbus.

The second base plate 20 may also comprise at least a part of a local bus that interconnects the connection terminals of the second socket with a fieldbus socket. In this case a first part of the local bus may be provided via the first base plate and a second part of the local bus may be provided via the second base plate. The fieldbus socket may in turn be provided on the first or the second base plate. The fieldbus socket may additionally comprise or hold a fieldbus communication unit.

At least the first I/O module may be a universal I/O module, such as an I/O module handing both digital and analog input and output signals as well as all possible voltage levels. The first I/O module may thus be a universal I/O module. Also the second I/O module may be a universal I/O module.

It is also possible that the first I/O module 14 can operate on more than one voltage level, such as 24V and 230 V. It is instead or additionally possible that the second I/O module 22 can operate on more than one voltage level.

It is also possible that the first I/O module 14 is a first type of I/O module and the second I/O module 22 is a second type of I/O module.

For instance, the first I/O module may only operate on analog input signals and analog output signals and the second I/O module may only operate on digital input signals and digital output signals or vice versa. Thereby the first I/O module may be a universal analog I/O module and the second I/O module may be a universal digital I/O module. The first I/O module may thus only be capable to operate on analog input signals and analog output signals and the second I/O module may only be capable to operate on digital input signals and digital output signals.

Put differently, the first I/O module 14 may be a universal analog I/O module operable to handle all types of analog input signals and analog output signals, while the second I/O module 22 may be a universal digital I/O module operable to handle all types of digital input signals and digital output signals.

If the second I/O module is able to operate on two voltages it may for instance be a combined DI 24V and DI 230V I/O module.

The field devices operating with analog input signals and analog output signals may be connected to the first set of connection terminals 18, via one or more multicore cables only carrying analog input signals and analog output signals, while the field devices operating with digital input signals and digital output signals may be connected to the second set of connection terminals 26 via one or more multicore cables only carrying digital input signals and digital output signals. Thereby, the first set of connection terminals may be adapted to be attached to the one or more multicore cables only carrying analog input signals and analog output signals and the second set of connection terminals may be adapted to be attached to the one or more multicore cables only carrying digital input signals and digital output signals.

Figure 4:
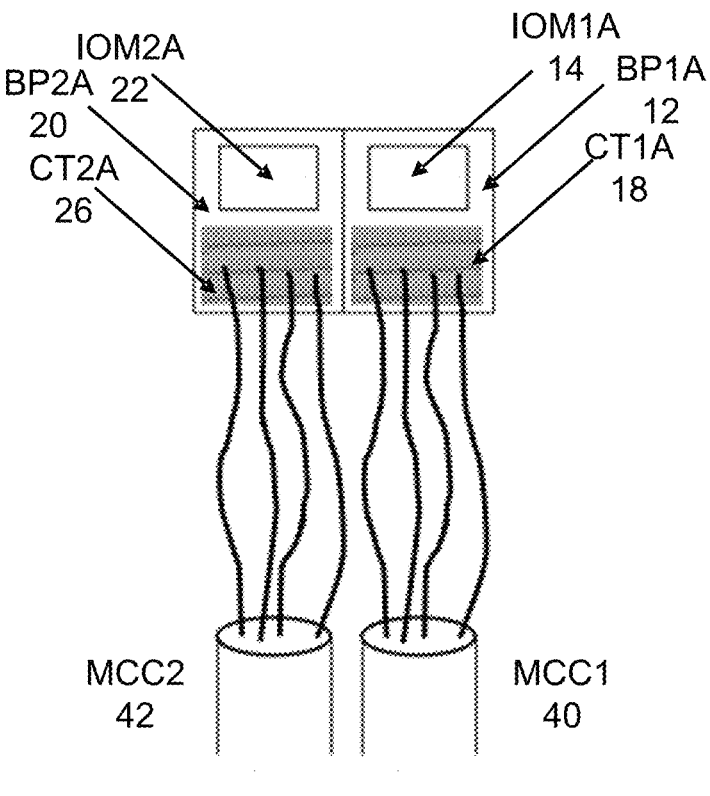

This is schematically shown in FIG. 4, where a first multicore cable MCC1 40 carrying the first set of wires leading to the first group of field devices is connected to the first set of connection terminals 18, while a second multicore cable MCC2 42 carrying the second set of wires leading to the second group of field devices is connected to the second set of connection terminals 26 and where the first set of wires only carries analog signals, such as analog input signals and analog output signals, and the second set of wires only carries digital signals, such as digital input signals and digital output signals.

It should be realized that the I/O module arrangement may also comprise the first and second sets of wires in the form of two or more multicore cables.

The I/O module arrangement described above has a number of further advantages.

As has been implied above, there exists a so called Universal I/O module. A typical Universal I/O module holds a number of channels, where each channel can be configured as AI or AO or DI or DO. Since these types of I/O modules need to carry hardware electronics for AI and AO and DI and DO they tend to be relatively costly.

Moreover, as input and output signals in multicore cables are normally sorted, one multicore cable holds analog input and analog output and another multicore cable holds digital input and digital output signals, there is no real need for a Universal I/O module with AI/AO/DI/DO. Thus, most existing solutions on the market are overengineered and costly, e.g. Universal I/O modules that implement hardware electronics for AI/AO/DI/DO.

Instead of having Universal I/O modules that implement hardware electronics for AI/AO/DI/DO, there is thus proposed a Universal DI/DO module and a Universal AI/AO module, where the Universal DI/DO module is connected to a multicore cable only carrying digital input and digital output signals and the Universal AI/AO module is connected to a multicore cable only carrying analog input and analog output signals. As can be seen in FIG. 4, there is no need for any marshaling since the signal types are sorted as AI/AO multicore cables and DI/DO multicore cables. This avoiding of marshaling is combined with a simpler universal I/O module realization without unnecessary signal processing. The first I/O module 14 may for instance be a universal analog I/O module and the second I/O module 22 may be a universal digital I/O module. A universal analog I/O module is also cheaper than a "general" universal I/O module. Also a universal digital I/O module is cheaper than a "general" universal I/O module.

Alternatively, the first I/O module may operate on input and output signals of the first set of wires that have a first voltage level and the second I/O module may operate on input and output signals of the second set of wires that have a second voltage level.

Thus as an alternative to being a universal analog I/O module and a universal digital I/O module, the first I/O module 14 may be an I/O module that operates on 24 V signals and possibly also on 48 V signals, while the second I/O module may be an I/O module that operates on 230 V signals and perhaps also on 120V signals.

This allows the two I/O modules to be adapted for different voltage levels.

Figure 5:
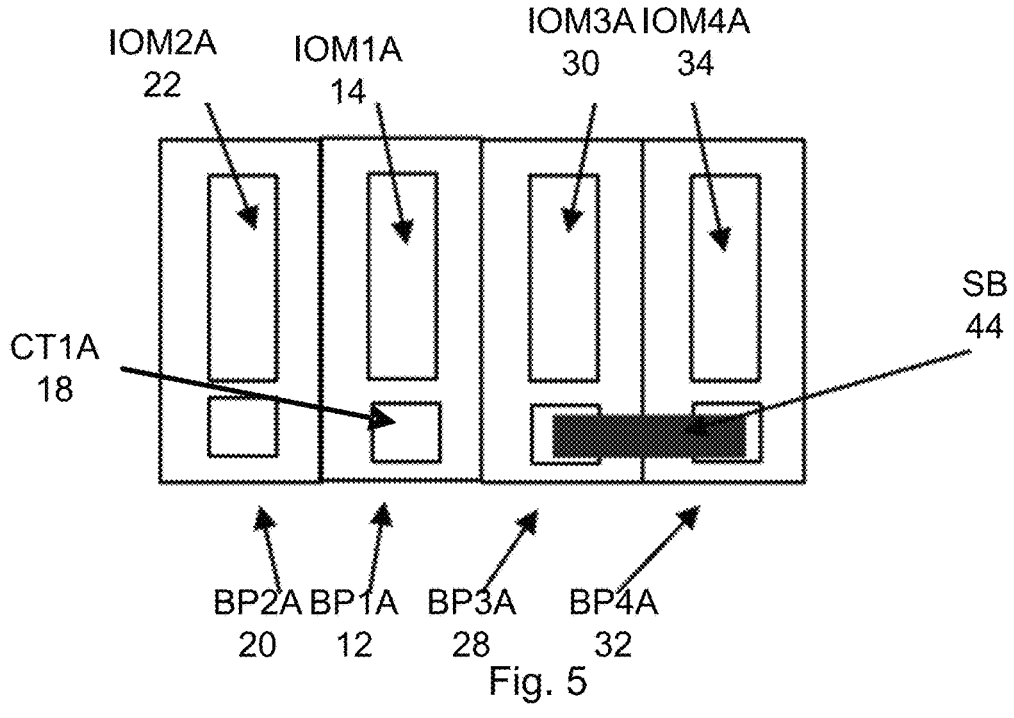

Another example where there is more than one base plate is shown in FIG. 5, which shows a third embodiment of the I/O module arrangement. In this case the I/O module arrangement comprises four base plates, of which at least two are identical. Also, the slots and connection terminal blocks have the same realization in the base plates.

In addition to the use of the first and second sockets and the first and second sets of communication terminals on the first and second base plates, there is here a third socket for a third I/O module, a third set of connection terminals as well as a fourth socket for a fourth I/O module and a fourth set of connection terminals, where the third socked and third set of connection terminals is provided on a third base plate BP3A 28 and the fourth socket and fourth set of connection terminals are provided on a fourth base plate BP4A 32. The third set of connection terminals may be provided for connection of the third I/O module to a third set of wires leading to a third group of field devices of the process control system and the fourth set of connection terminals may be provided for connection of the fourth I/O module to a fourth set of wires leading to a fourth group of field devices of the process control system. However, in the present case no set of wires is connected to the fourth set of connection terminals. Alternatively, it is possible that no set of wires are connected to the fourth connection terminal.

Here, the sockets may each comprise one or more connection terminal allowing the corresponding I/O module to communicate with the controller of the process control system via the fieldbus.

In this case the second base plate 20 is attachable to the third side of the first base plate 12. Thereby the third side of the first base plate BP1A 12 may again be attached to a fourth side of the second base plate BP2A 20. Also, the third base plate 28 is attachable to the fourth side of the first base plate 12. Thereby, the fourth side of the first base plate 12 may be attached to the third side of a third base plate 28. The fourth base plate BP4A 32 in turn has a third side attached to the fourth side of the third base plate 28. As can be seen above, all base plates have a set of connection terminals for the connection of field devices to I/O modules attached to sockets of the base plates. As can be seen in FIG. 5 all these sets of connection terminals are provided at the first side of the base plates. Thereby the sets of connection terminals are also in this case aligned with each other along the first sides of the base plates.

A local bus may be provided via all the base plates 12, 20, 28, 32 for interconnecting connection terminals of the different I/O module sockets with a fieldbus socket, which fieldbus socket may be provided on one of the base plates, such as the second base plate 20. The fieldbus socket may additionally comprise or hold a fieldbus communication unit.

As before the first I/O module IOM1A 14 is attached to the first base plate 12 and the second I/O module IOM2A 22 is attached to the second base plate 20. Additionally, a third I/O module IOM3A 30 is attached to the third base plate 28 and a fourth I/O module IOM4 34 is attached to the fourth base plate BP4A 32.

The first I/O module 14 may in this case be an I/O module that operates on 24 V signals and possibly also on 48 V signals, while the second I/O module IOM2A 22 attached to the second base plate 20 may be an I/O module that operates on 230 V signals and possibly also on 120 V signals. As an alternative one of the I/O modules may be a universal analog I/O module and the other a universal digital I/O module. The third I/O module 30 and the fourth I/O module 34 may on the other hand be of the same type. They may be of any of the previous described types discussed in relation to the first variation of the I/O module arrangement. They may also be universal I/O modules.

The purpose is here to provide redundancy in relation to the third and fourth I/O modules 30, 34 and therefore they are with advantage of the same type. In order to provide redundancy, there is also a signal bridge SB 44 for interconnecting one set of connection terminals associated with a socket for one I/O module with another set of connection terminals associated with another socket for another I/O module. The signal bridge 44 is used to bridge the terminals of two sets of connection terminals. In this case the signal bridge 44 is connected between the set of connection terminals of the third base plate 28 and the set of connection terminals of the fourth base plate 32 and electrically interconnects a connection terminal of the third set of connection terminals of the third base plate 28 with a corresponding connection terminal of the fourth set of connection terminals of the fourth base plate 32.

It is possible that all connection terminals in the third set of the third base plate 28 are connected with corresponding connection terminals in fourth the set of the fourth base plate 32. Therefore, no field wires need to be connected to the fourth base plate 32. Alternatively, it is possible to omit the connection of field wires to the third base plate 28.

It should here be realized that in a variation of the second embodiment, the signal bridge is connected between the first and second sets of connection terminals, in which case the first and second I/O modules could also be of the same type.

It should here be realized that the I/O module arrangement according to the third embodiment may only be made up of the base plates 12, 20, 28, 32 and the signal bridge 44. It should also be realized that a signal bridge may also be used in the second embodiment.

Figure 6:
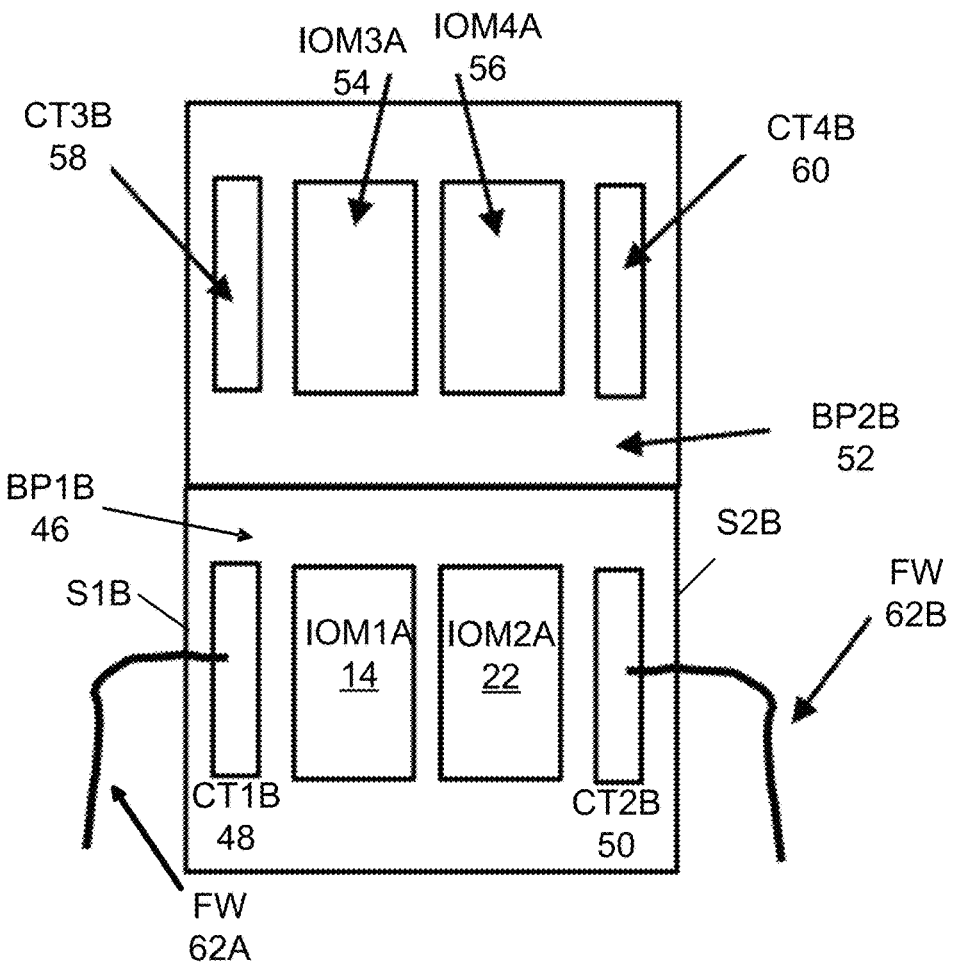

A fourth embodiment of the I/O module arrangement can be seen in FIG. 6. This embodiment is suitable for vertical mounting. In this case the first base plate BP1B 46 has two sockets for two I/O modules and two sets of connection terminals for field devices. There is thus a first set of connection terminals CT1B 48 for the first I/O module IOM1A 14 and a second set of connection terminals CT2B 50 for a second I/O module IOM2A 22 on the first base plate 46. Again, the first set of connection terminals 48 are provided along the first side S1B of the first base plate 46. However, in this case the second set of connection terminals CT2B are provided along the second side S2B of the first base plate 46, which second side is opposite to the first side S1B. When being mounted in a mounting cabinet, the first base plate 46 has a vertical orientation. Then one of the first and second sides is provided on a left side and the other on a right side of the base plate. This simplifies connection of cabling.

The connection terminals and sockets are furthermore aligned with each other between the first and second sides S1B, S2B. They are thus placed along a line between the first and second sides S1B, S2B. First and second field wiring FW 62A, FW 62B is also shown as being connected to the to the first and second sets of connection terminals 48, 50.

The third side of the first base plate 46 is in this case attached to a fourth side of a second base plate BPB2 52 having the same realization as the first base plate 46. The second base plate 52 likewise has two sockets for two I/O modules 54, 56 and two sets of connection terminals for field devices.

Also here there is a third socket for a third I/O module, a third set of connection terminals as well as a fourth socket for a fourth I/O module and a fourth set of connection terminals. The third set of connection terminals may be provided for connection of the third I/O module to a third set of wires leading to a third group of field devices of the process control system and the fourth set of connection terminals may be provided for connection of the fourth I/O module to a fourth set of wires leading to a fourth group of field devices of the process control system.

The third and fourth sockets and third and fourth sets of connection terminals are in this case provided on the second base plate 52.

There is a third set of connection terminals CT3B 58 for a third I/O module IOM3A 54 and a fourth set of connection terminals CT4B 60 for a fourth I/O module IOM4A 56. The third set of connection terminals 58 are provided along the first side of the second base plate 52 and the fourth set of connection terminals 60 are provided along the second side of the second base plate 52. The connection terminals and sockets are furthermore aligned with each other between the first and second sides. They are thus placed along a line between the first and second sides. Thereby the sets of connection terminals 48, 58 at the first sides S1B of the base plates 46, 52 are aligned with each other and the sets of connection terminals 50, 60 at the second sides S2B of the base plates 46, 52 are aligned with each other.

Also here, the sockets may each comprise one or more connection terminal allowing the corresponding I/O module to communicate with the controller of the process control system via the fieldbus.

A local bus may be provided via the base plates 46, 52 for interconnecting connection terminals of the different I/O module sockets with a fieldbus socket, which fieldbus socket may be provided on one of the base plates, such as the first base plate 46. The fieldbus socket may additionally comprise or hold a fieldbus communication unit.

The first and second I/O modules may be of the same types as the first and second I/O modules in the third embodiment depicted in FIG. 5, although other types are possible. The third and the fourth I/O modules 54, 56 being placed in the second base plate 52 may be of the same or other types. They may as an example be universal analog I/O modules and universal digital I/O modules.

The first and second sets of communication terminals 48, 50 may as is shown be connected to a first and second set of wires 62A, 62B leading to a first and second group of field devices. Also the third and fourth connection terminals may in an analogous be connected way to a third and fourth set of wires leading to a first and second group of field devices. Alternative a signal bridge may be connected between the connection terminals on the first side of the base plates 46, 52 and/or between the connection terminals on the second side of the base plates 46, 52.

Figure 7:
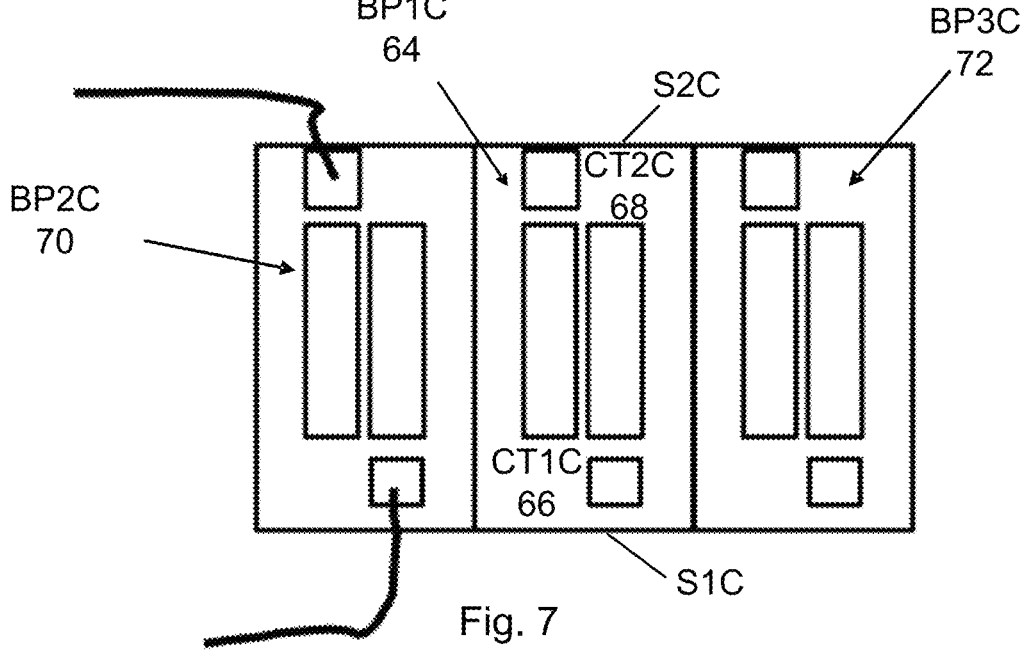

A variation of the fourth embodiment of the I/O module arrangement can be seen in FIG. 7, which variation is suitable for horizontal mounting.

Also in this case the first base plate BPC1 64 has two sockets for two I/O modules and two sets of connection terminals for field devices, where again, the first set of connection terminals CT1C 66 are provided along the first side S1C of the first base plate 64 and the second set of connection terminals CT2C 68 are provided along the second side S2C of the first base plate 64. In this variation the first set of connection terminals 66 and the first socket are placed along a first line between the first and second sides, while the second set of connection terminals 68 and the second socket are placed along a second line between the first and second sides, which second line is parallel with the first line. Furthermore, the first and second sockets are placed side by side. When being mounted in a mounting cabinet, the first base plate 64 has a horizontal orientation. Then one of the first and second sides is directed upwards and the other downwards. This also simplifies connection of cabling.

In this case there is also a fifth socket for a fifth I/O module, a fifth set of connection terminals as well as a sixth socket for a sixth I/O module and a sixth set of connection terminals, where the fifth and sixth sets of connection terminals are provided on a third base plate BP3C 72. The fifth set of connection terminals may be provided for connection of the fifth I/O module to a fifth set of wires leading to a fifth group of field devices of the process control system and the sixth set of connection terminals may be provided for connection of the sixth I/O module to a sixth set of wires leading to a sixth group of field devices of the process control system.

Also here, the sockets may each comprise one or more connection terminal allowing the corresponding I/O module to communicate with the controller of the process control system via the fieldbus.

The third side of the first base plate 64 is also in this case attached to a fourth side of a second base plate BP2C 70 having the same realization. Put differently, the fourth side of the first base plate 64 may be attached to a third side of a third base plate BP3C 72 having the same realization. Thereby the sets of connection terminals at the first sides of the base plates are aligned with each other and the sets of connection terminals at the second sides of the base plates are aligned with each other.

A local bus may be provided via all the base plates 64, 70, 72 for interconnecting connection terminals of the different I/O module sockets with a fieldbus socket, which fieldbus socket may be provided on one of the base plates, such as the third base plate 72. The fieldbus socket may additionally comprise or hold a fieldbus communication unit.

The I/O modules may in this case be any types of I/O modules.

As can be seen above, the base plates can each host two I/O modules and have the sets of connection terminals pointing in different directions (left and right or up and down) to ease cabling. This also has the advantage of lowering the manufacturing cost of the I/O module arrangement and saving footprint in the cabinet when installed. In addition, easy connection of cables from different directions is allowed.

As an example the dual base plates that can host different signals types, e.g. mA/TC/RTD/24V/48V/120V/230V. It is also possible with different dual base plates for different signal types, e.g. one for mA/TC/RTD and 24V/48 V signals, and one for 120/230V signals.

As before, the slots and connection terminal blocks may have the same realization in the base plates. It is also possible that the I/O module arrangement only comprises the first base plate.

Furthermore, it is possible to connect a signal bridge between two connection terminals on the first side of the base plates 64, 70, 72 and/or between two connection terminals on the second side of the base plates 64, 70, 72.

Figure 8:
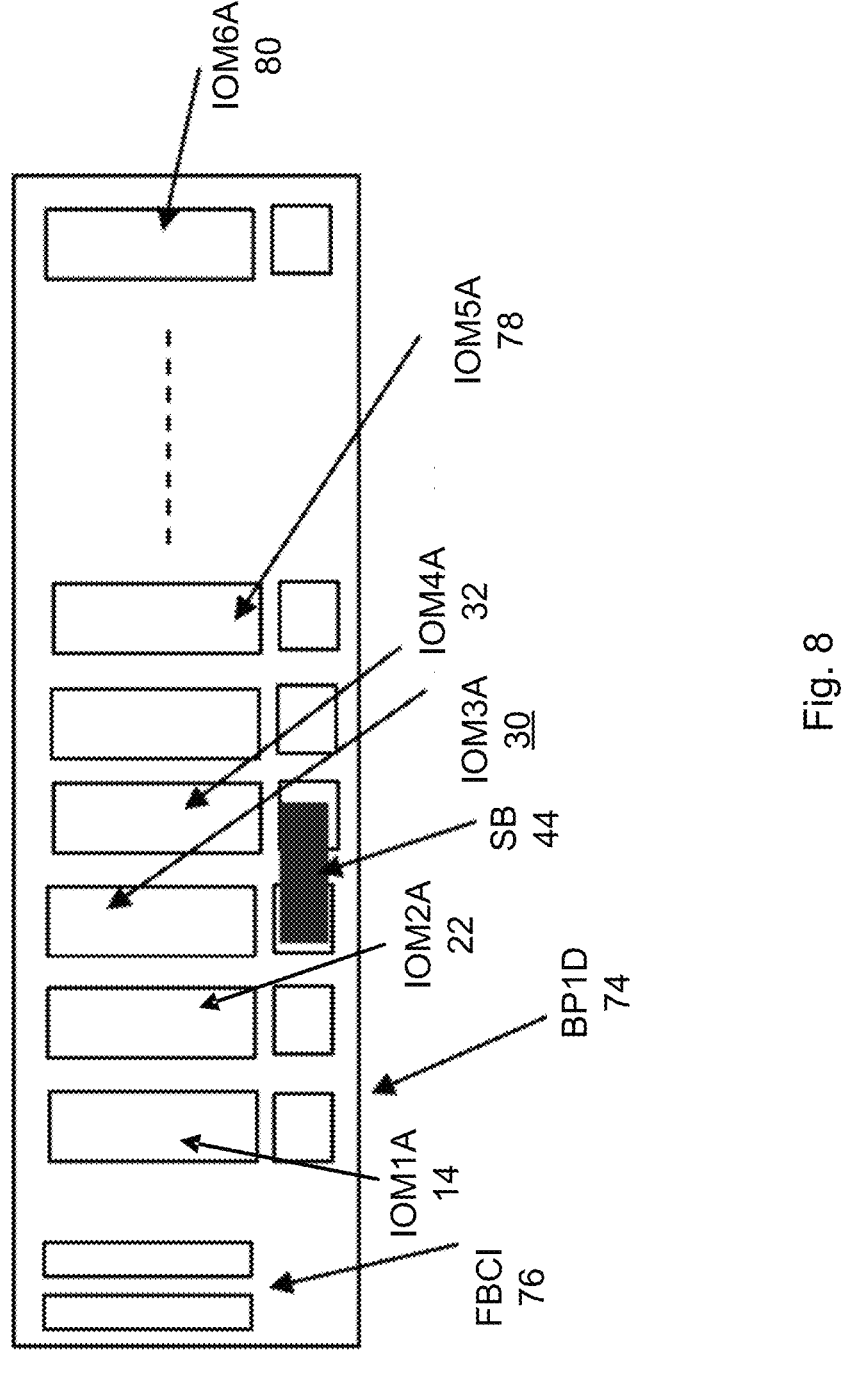

FIG. 8 shows a fifth embodiment of the I/O module arrangement comprising the first base plate BP1D 74. In this case it has several slots for receiving several different I/O modules as well as several corresponding sets of connection terminals, which sets of connection terminals are all placed along the first side of the base plate 74. The base plate 74 is thus common for all signal types and all I/O module types. The slots and connection terminal blocks may have the same realization in the base plate.

The sockets each comprise one or more connection terminal allowing the corresponding I/O module to communicate with the controller of the process control system via the fieldbus. Thus, the sockets each comprise one or more connection terminal allowing the corresponding I/O module to communicate with the controller of the process control system via the fieldbus.

In this case the first base plate comprises the local bus that interconnects connection terminals of the first, second, third, fourth, fifth and sixth socket with at least one fieldbus socket on the first base plate 74. Each fieldbus socket may additionally comprise or hold a fieldbus communication unit. A fieldbus socket and/or the fieldbus communication unit placed in it may also be considered to form a fieldbus communication interface.

As an example, there is a first I/O module 14 for 24 V and a second I/O module 22 for 230 V as well as a third and a fourth I/O module 30, 34 of the same type for redundancy purposes. The sets of connection terminals for the slots into which the third and fourth I/O modules 30, 34 are plugged are in this case interconnected by a signal bridge 44. There is also fifth and sixth I/O module IOM5A 78, IOM6A 80, which may be a universal analog I/O module and a universal digital I/O module.

In this case there is also a first and a second fieldbus communication interface FBCI 76, i.e. a pair of field bus communication interfaces, for connecting the I/O modules to a controller via a fieldbus. Thus, the pair of field bus interfaces allows the I/O modules to communicate with the controller via the fieldbus. The use of two interfaces may serve the use of redundancy.

Thereby some connection terminals in each socket are interconnected with the first and second field bus interface 76.

The first base plate 74 is also here designed in a way so it can interface to all different signal types. The base plate 74 will also have terminals so that 1-wire, 2-wire, 3-wire and 4-wire instruments can be connected. The signal bridge 44 is used to bridge the terminals of two terminal blocks for implementation of redundant I/O modules (where two I/O modules are connected to the same instruments).

The distance between the connection terminals of each set of connection terminals 26, the distance between the conductors that interconnect each set of connection terminals with the connection terminals of the corresponding socket as well as the connection terminals of these sockets may be based on the creepage and clearance distances associated with the highest of the possible voltage levels of the input and output signals.

It should here be realized that the first and second I/O modules 14, 22 may be universal analog and universal digital I/O modules instead.

Alternatively, the first and second I/O modules 14, 22 could be identical and the signal bridge may be connected between the first and second sets of communication terminals in order to provide redundancy.

The sets of connection terminals may be provided in terminal blocks that may be pluggable or fixed, It is also possibility to have different coloring on the terminals, e.g. grey for standard signals, red for 120/230V signals and blue for Intrinsically Safe I/O.

It should here be realized that the I/O module arrangement may only comprise the first base plate, the first base plate and the signal bridge, the first base plate and the I/O modules or the first base plate, the signal bridge and the I/O modules. It is also possible that some of the slots and sets of communication terminals are unused as well as to have more and fewer slots and sets of connection terminals on the base plate.

The invention claimed is:

1. An Input/Output, I/O, module arrangement for a process control system, the I/O module arrangement comprising:

a first base plate for at least one I/O module, the first base plate having a first socket for a first I/O module and a first set of connection terminals for connection of the first I/O module to a first set of wires leading to a first group of field devices of the process control system, the first base plate being adapted to allow the first and any other I/O module that is attached to it to be any type of I/O module operating on input and output signals of any type of field device; and a second socket for a second I/O module and a second set of connection terminals for connection of the second I/O module to a second set of wires leading to a second group of field devices of the process control system;

wherein the first I/O module only operates on analog input signals and analog output signals and the second I/O module only operates on digital input signals and digital output signals;

wherein the first set of connection terminals is to be connected to the first group of field devices via one or more multicore cables only carrying analog input signals and analog output signals and the second set of connection terminals is to be connected to the second group of field devices using one or more multicore cables only carrying digital input signals and digital output signals.

2. The I/O module arrangement according to claim 1, wherein the number of connection terminals in the first set corresponds to the number of field device connections that can be made to an I/O module.

3. The I/O module arrangement according to claim 1, wherein the connection terminals in the first set comprise three or more connection terminals per connectable field device.

4. The I/O module arrangement according to claim 1, wherein the first socket has connection terminals for mating with corresponding connection terminals of the first I/O module and the connection terminals of the first set of connection terminals are interconnected with connection terminals of the first socket by conductors running in the first base plate and the distance between the connection terminals of the first set of connection terminals, the distance between the conductors and the distance between the connection terminals of the first socket are based on the creepage and clearance distances associated with a signal voltage level of the input and output signals.

5. The I/O module arrangement according to claim 1, wherein the first I/O module operates on input and output signals of the first set of wires that have a first voltage level and the second I/O module operates on input and output signals of the second set of wires that have a second voltage level.

6. The I/O module arrangement according to claim 1, wherein first I/O module and/or the second I/O module is capable of operating on more than one voltage level.

7. The I/O module arrangement according to claim 1, further comprising a signal bridge for interconnecting one set of connection terminals associated with a socket for one I/O module with another set of connection terminals associated with another socket for another I/O module.

8. The I/O module arrangement according to claim 1, wherein the first base plate has a rectangular shape and the first set of connection terminals are provided along a first side of the first base plate.

9. The I/O module arrangement according to claim 1, wherein the first base plate has a rectangular shape and the first set of connection terminals are provided along a first side of the first base plate.

10. The I/O module arrangement according to claim 9, further comprising a second base plate and wherein the second socket and the second set of connection terminals are provided on the second base plate.

11. The I/O module arrangement according to claim 9, wherein the second set of connection terminals are provided on the first base plate along the first side.

12. The I/O module arrangement according to claim 9, wherein the second set of connection terminals are provided on the first base plate along a second side of the first base plate opposite of the first side.

13. The I/O module arrangement according to claim 12, wherein the first base plate has a horizontal orientation when being mounted in a mounting cabinet and one of the first and second sides is directed upwards and the other downwards.

14. The I/O module arrangement according to claim 12, wherein the first base plate has a vertical orientation when being mounted in a mounting cabinet and one of the first and second sides is provided on a left side and the other on a right side of the base plate.

15. The I/O module arrangement according to claim 1, wherein the first I/O module comprises AI RTD/TC, AI mA, AO mA, AI V, AO V, DI 24V to 230V, DO 24V to 230V, or HART.

16. The I/O module arrangement according to claim 1, wherein the first group of field devices comprises at least one of a 2-wire field device, a 3-wire field device, a 4-wire field device, a sink field device, or a source field device.

* * * * *